US010841592B2

(12) United States Patent
Auyeung et al.

(10) Patent No.: US 10,841,592 B2
(45) Date of Patent: *Nov. 17, 2020

(54) EXTENSIONS OF MOTION-CONSTRAINED TILE SETS SEI MESSAGE FOR INTERACTIVITY

(71) Applicant: SONY CORPORATION, Tokyo (JP)

(72) Inventors: Cheung Auyeung, Sunnyvale, CA (US); Jun Xu, San Jose, CA (US); Ali J Tabatabai, Cupertino, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,552

(22) Filed: Apr. 17, 2019

(65) Prior Publication Data

US 2019/0246116 A1 Aug. 8, 2019

Related U.S. Application Data

(63) Continuation of application No. 14/331,490, filed on Jul. 15, 2014, now Pat. No. 10,368,078.

(Continued)

(51) Int. Cl.
*H04N 19/162* (2014.01)
*H04N 19/33* (2014.01)
(Continued)

(52) U.S. Cl.
CPC ......... *H04N 19/162* (2014.11); *H04N 19/103* (2014.11); *H04N 19/172* (2014.11); *H04N 19/33* (2014.11); *H04N 19/70* (2014.11)

(58) Field of Classification Search
CPC .... H04N 19/162; H04N 19/33; H04N 19/103; H04N 19/172; H04N 19/70

(Continued)

(56) References Cited

U.S. PATENT DOCUMENTS 6,263,022 B1 * 7/2001 Chen .................... H04N 19/126
375/240.03
8,265,392 B2 9/2012 Wang et al.
(Continued)

FOREIGN PATENT DOCUMENTS

CN 101313578 A 11/2008
JP 2004-040351 A 2/2004
(Continued)

OTHER PUBLICATIONS

Office Action for JP Patent Application No. 2018-093543, dated Apr. 2, 2019, 05 pages of Office Action and 07 pages of English Translation.

(Continued)

*Primary Examiner* — Zaihan Jiang
(74) *Attorney, Agent, or Firm* — Chip Law Group (57) ABSTRACT

An extension to the motion-constrained tile sets SEI message provides functionality to signal all tiles are independently decodable and to signal the ROIs that may have more than one tile per ROI. With this extension, the functionality to redefine any independently decodable region-of-interest in a CVS at a coding tree unit level based on user interactivity is enabled. The extension supports the interactivity utilized in various applications such as interactive Ultra High Definition Television (UHDTV), dynamic high-quality zoom-in application, interactive on-demand, e-learning, smart surveillance and many other applications. Additionally, the temporal MCTS SEI message is able to be used by an encoder for tiled streaming to signal explicitly to the decoder that the decoder need only to display the ROI.

13 Claims, 5 Drawing Sheets

Related U.S. Application Data (60) Provisional application No. 61/928,107, filed on Jan. 16, 2014, provisional application No. 61/923,351, filed on Jan. 3, 2014, provisional application No. 61/859,347, filed on Jul. 29, 2013, provisional application No. 61/846,555, filed on Jul. 15, 2013.

(51) Int. Cl.
  *H04N 19/70* (2014.01)
  *H04N 19/172* (2014.01)
  *H04N 19/103* (2014.01)

(58) Field of Classification Search
  USPC .................................................. 375/240.2
  See application file for complete search history.

(56) References Cited

U.S. PATENT DOCUMENTS

| | | | |
|---|---|---|---|
| 8,471,902 B2* | 6/2013 | Kang | H04N 21/235 348/135 |
| 8,762,555 B1* | 6/2014 | Peterson | G06F 16/29 709/229 |
| 2006/0215753 A1 | 9/2006 | Lee et al. | |
| 2007/0206673 A1 | 9/2007 | Cipolli et al. | |
| 2008/0198933 A1 | 8/2008 | Srinivasan et al. | |
| 2009/0041117 A1 | 2/2009 | Hannuksela | |
| 2009/0300692 A1* | 12/2009 | Mavlankar | H04N 21/234318 725/94 |
| 2010/0111193 A1 | 5/2010 | Pandit et al. | |
| 2010/0158135 A1 | 6/2010 | Yin et al. | |
| 2012/0005366 A1 | 1/2012 | Ma et al. | |
| 2012/0163452 A1 | 6/2012 | Horowitz | |
| 2012/0188235 A1* | 7/2012 | Wu | G06T 7/50 345/419 |
| 2012/0269275 A1 | 10/2012 | Hannuksela | |
| 2013/0101035 A1 | 4/2013 | Wang et al. | |
| 2013/0107952 A1 | 5/2013 | Coban et al. | |
| 2013/0182775 A1* | 7/2013 | Wang | H04N 19/46 375/240.24 |
| 2013/0208808 A1 | 8/2013 | Sasai et al. | |
| 2013/0304935 A1 | 11/2013 | Chen et al. | |
| 2014/0016703 A1* | 1/2014 | Denoual | H04N 19/33 375/240.16 |
| 2014/0098851 A1* | 4/2014 | Chen | H04N 19/46 375/240.02 |
| 2014/0247876 A1 | 9/2014 | Moriya et al. | |
| 2014/0254669 A1 | 9/2014 | Rapaka et al. | |
| 2014/0307976 A1* | 10/2014 | McLane | H04N 19/647 382/233 |
| 2015/0010091 A1 | 1/2015 | Hsu et al. | |
| 2015/0208095 A1* | 7/2015 | Schierl | H04N 21/234327 375/240.28 |
| 2016/0080753 A1 | 3/2016 | Oh | |
| 2016/0142722 A1* | 5/2016 | Maeda | H04N 19/105 375/240.08 |
| 2016/0173890 A1* | 6/2016 | Hattori | H04N 19/33 375/240.25 |

FOREIGN PATENT DOCUMENTS

| | | |
|---|---|---|
| JP | 2004-112566 A | 4/2004 |
| JP | 2007-174568 A | 7/2007 |
| JP | 2007-180801 A | 7/2007 |
| JP | 2007-235314 A | 9/2007 |
| JP | 2009-021901 A | 1/2009 |
| WO | 2013/001013 A1 | 1/2013 |
| WO | 2013/021619 A1 | 2/2013 |
| WO | 2013/027407 A1 | 2/2013 |
| WO | 2013/063425 A1 | 5/2013 |
| WO | 2013/065673 A1 | 5/2013 |
| WO | 2013/077236 A1 | 5/2013 |

OTHER PUBLICATIONS

Wu, et al., "Motion-Constrained Tile Sets SEI Message", Joint Collaborative Team on Video Coding (JCT-VC) of ITU-T SG 16 WP 3 and ISO/IEC JTC1/SC29/WG11, 13 Meeting, Incheon, KR, JCTVC-M0235, Apr. 18-26, 2013, pp. 1-5.

Nakagami, et al., "Bitstream Restriction Flag to Enable tile Split", Joint Collaborative Team on Video Coding (JCT-VC) of ITU-T SG 16 WP 3 and ISO/IEC JTC1/SC29/WG11, 9 Meeting, Geneva, JCTVC-I0056, Apr. 27-May 7, 2012, pp. 1-4.

Office Action for KR Patent Application No. 10-2016-7000348, dated Oct. 11, 2019, 05 pages of Office Action and 04 pages of English Translation.

Office Action for KR Patent Application No. 10-2017-7033410, dated Oct. 11, 2019, 05 pages of Office Action and 04 pages of English Translation.

Ye, et al., "SEI Message: Independently Decodable regions based on Tiles" Joint Collaborative Team on Video Coding (JCT-VC) of ITU-T SG16 WP3 and ISO/IEC JTC1/SC29/WG11, 12th meeting, Geneva, CH, Jan. 14-23, 2013, 08 pages.

Notice of Allowance and Fees Due for U.S. Appl. No. 14/331,490, dated Mar. 14, 2019, 14 pages.

Final Rejection for U.S. Appl. No. 14/331,490, dated Aug. 9, 2018, 16 pages.

Non-Final Rejection for U.S. Appl. No. 14/331,490, dated Mar. 7, 2018, 27 pages.

Advisory Action for U.S. Appl. No. 14/331,490, dated Sep. 21, 2017, 05 pages.

Final Rejection for U.S. Appl. No. 14/331,490, dated Jun. 29, 2017, 14 pages.

Non-Final Rejection for U.S. Appl. No. 14/331,490, dated Jan. 12, 2017, 12 pages.

Office Action for CN Patent Application No. 201480038849.6, dated Aug. 6, 2018, 09 pages of Office Action and 13 pages of English Translation.

Schrijver, et al., "Exploitation of Interactive Region of Interest Scalability in Scalable Video Coding by Using an XML-Driven Adaptation Framework", 2nd International Conference on Automated Production of Cross Media Content for Multi Channel Distribution, Jan. 1, 2006, 09 pages.

Wu, et al, "Motion-Constrained Tile Sets SEI Message" Joint Collaborative Team on Video Coding (JCT-VC) of TU-T SG 16 WP 3 and ISO/IEC JTC 1/SC 29/WG 11,13th Meeting, Icheon, KR, JCTVC-M0235, Apr. 18-26, 2013, 04 pages.

Auyeung, et al, "HLS: Extensions of Malian-Constrained Tile Sets SEI Message for Interactivity", Joint Collaborative Team on Video Coding (JCT-VC) of ITU-T SG16 WP3 and ISO/IEC JTC1/SC29/WG11, JCTVC-N0236, 4th Meeting, Jul. 29-Aug. 2, 2013, 05 pages.

Office Action for JP Patent Application No. 2017-099071, dated Mar. 6, 2018, 06 pages of Office Action and 04 pages of English Translation.

Office Action for CN Patent Application No. 201480038849.6, dated Dec. 5, 2017, 08 pages of Office Action and 10 pages of English Translation.

Slice Prefix for Sub-Picture and Slice Level HLS signalling, Joint Collaborative Team on Video Coding (JCT-VC) of TU-T SG 16 WP 3 and ISO/IET JTC 1/SC 29/WG 11,Jul. 11-Jul. 20, 2012,12 pages.

"Independent Tile Upsampling for SHVC", Joint Collaborative Team on Video Coding (JCT-VC) of ITU-T SG 16 WP 3 and ISO/IET JTC 1/SC 29/WG 11, Apr. 18/16, 2013, 04 pages.

"Motion and Inter-Layer Prediction Constrained SEI Message", Joint Collaborative Team on Video Coding (JCT-VC) of TU-T SG 16 WP 3 and ISO/IET JTC 1/SC 29/WG 11, Jul. 25-Aug. 2, 2013, 05 pages.

Office Action for JP Patent Application No. 2016-527023, dated Feb. 21, 2017, 11 pages of Office Action and 11 pages of English Translation.

Office Action for KR Patent Application No. 10-2016-7000348, dated Jan. 31, 2017, 05 pages of Office Action and 04 pages of English Translation.

(56) References Cited

OTHER PUBLICATIONS

Ye, et al., "SEI Message: Independently Decodable Regions Based on Tiles", Joint Collaborative Team on Video Coding (JCT-VC) of ITU-T SG 16 WP 3 and ISO/IEC JTC 1/SC 29/WG 11, JCTVC-L0049, 12th Meeting: Geneva, CH, Jan. 14-23, 2013, 08 pages.
Extended European Search Report of EP Application No. 14825653.0, dated Oct. 25, 2016, 15 pages.
Boyce, et al., "No Display SEI Message", Joint Collaborative Team on Video Coding (JCT-VC) of ITU-T SG 16 WP 3 and ISO/IEC JTC 1/SC 291WG 11 13th Meeting: Incheon, KR, Apr. 18-26, 2013, 03 pages.
Thomas, et al., "Description of Core Experiment on Spatial Relationship Description", TNO, Telecom Paris Tec Canon Research Centre France, Apr. 2013, 07 pages.
Suehring, et al., "Inter-Layer Constrained Tile Sets SEI Message", Joint Collaborative Team on Video Coding (JCT-VC) of ITU-T SG 16 WP 3 and ISO/IEC JTC 1/SC 29/WG 11 14th Meeting: Vienna, AT, Jul. 25-Aug. 2, 2013, 03 pages.
Mavlankar, et al., "An Interactive Region-of-Interest Video Streaming System for Online Lecture Viewing", Information Systems Laboratory, Department of Electrical Engineering. Stanford University, Stanford CA.

* cited by examiner

EXTENSIONS OF MOTION-CONSTRAINED TILE SETS SEI MESSAGE FOR INTERACTIVITY

CROSS REFERENCE TO RELATED APPLICATION(S)

The present application is a continuation application of U.S. patent application Ser. No. 14/331,490, filed Jul. 15, 2014 and claims the benefit of priority from U.S. Provisional Patent Application 61/846,555, filed Jul. 15, 2013. U.S. Provisional Patent Application 61/859,347, filed Jul. 29, 2013. U.S. Provisional Patent Application 61/923,351, filed Jan. 3, 2014, and U.S. Provisional Patent Application 61/928,107, filed Jan. 16, 2014, the entire content of which is hereby incorporated by reference Each of the above-referenced applications is hereby incorporated herein by reference in its entirety.

FIELD OF THE INVENTION

The present invention relates to the field of imaging. More specifically, the present invention relates to video coding.

BACKGROUND OF THE INVENTION

The motion-constrained tile sets in Range Extensions text specification, Draft 3 does not have the functionality to signal all tiles are independently decodable and to signal the Regions of Interest (ROI) that may have more than one tile per ROI.

SUMMARY OF THE INVENTION

An extension to the motion-constrained tile sets SEI message provides functionality to signal all tiles are independently decodable and to signal the ROIs that may have more than one tile per ROI. With this extension, the functionality to redefine any independently decodable region-of-interest in a CVS at a coding tree unit level based on user interactivity is enabled. The extension supports the interactivity utilized in various applications such as interactive Ultra High Definition Television (UHDTV), dynamic high-quality zoom-in application, interactive on-demand, e-learning, smart surveillance and many other applications. Additionally, the temporal MCTS SEI message is able to be used by an encoder for tiled streaming to signal explicitly to the decoder that the decoder need only to display the ROI.

In one aspect, a method programmed in a non-transitory memory of a device comprises receiving a bitstream of a video, wherein the bitstream includes a supplemental enhancement information message, further wherein the supplemental information message signals all tiles are independently decodable and that regions of interest are able to have more than one tile per region of interest and decoding the bitstream on the device. All tiles in a base layer of the video are independently decodable. All tiles in an enhancement layer of the video are independently decodable. Decoding includes providing a mapping of a region of interest in an enhancement layer to the region of interest in a base layer. Decoding includes providing a mapping of a region of interest in a base layer to the region of interest in an enhancement layer. A region of interest of the video is selected by a user, wherein the region of interest selected by the user is presented on the device. A region of interest of the video is selected by a user, wherein the region of interest selected by the user is presented on a second device. A region of interest of the video is selected by a director, wherein the region of interest selected by the director is presented on the device of a user. The video is encoded with independently decodable tiles and in one or more resolution layers and stored on a server. Different users request different resolution layers of the video. Different directors request different resolution layers of the video. The supplemental enhancement information message indicates coding tree blocks outside a selected region of interest, wherein the coding tree blocks outside the selected region of interest are not displayed. The supplemental enhancement information message indicates coding tree blocks outside a selected region of interest, wherein the coding tree blocks outside the selected region of interest are encoded as gray tiles to reduce bitrate.

In another aspect, a system comprises a non-transitory memory configured for storing an application, the application configured for: receiving a bitstream of a video, wherein the bitstream includes a supplemental enhancement information message, further wherein the supplemental information message signals all tiles are independently decodable and that regions of interest are able to have more than one tile per region of interest and decoding the bitstream and a display configured for displaying the decoded bitstream. All tiles in a base layer of the video are independently decodable. All tiles in an enhancement layer of the video are independently decodable. Decoding includes providing a mapping of a region of interest in an enhancement layer to the region of interest in a base layer. Decoding includes providing a mapping of a region of interest in a base layer to the region of interest in an enhancement layer. A region of interest of the video is selected by a user, wherein the region of interest selected by the user is presented on the device. A region of interest of the video is selected by a user, wherein the region of interest selected by the user is presented on a second device. A region of interest of the video is selected by a director, wherein the region of interest selected by the director is presented on the device of a user. The video is encoded with independently decodable tiles and in one or more resolution layers and stored on a server. Different users request different resolution layers of the video. Different directors request different resolution layers of the video. The supplemental enhancement information message indicates coding tree blocks outside a selected region of interest, wherein the coding tree blocks outside the selected region of interest are not displayed. The supplemental enhancement information message indicates coding tree blocks outside a selected region of interest, wherein the coding tree blocks outside the selected region of interest are encoded as gray tiles to reduce bitrate.

In another aspect, an apparatus comprises a non-transitory memory for storing an application, the application for: receiving a bitstream of a video, wherein the bitstream includes a supplemental enhancement information message, further wherein the supplemental information message signals all tiles are independently decodable and that regions of interest are able to have more than one tile per region of interest and decoding the bitstream and a processing component coupled to the memory, the processing component configured for processing the application. All tiles in a base layer of the video are independently decodable. All tiles in an enhancement layer of the video are independently decodable. Decoding includes providing a mapping of a region of interest in an enhancement layer to the region of interest in a base layer. Decoding includes providing a mapping of a region of interest in a base layer to the region of interest in an enhancement layer. A region of interest of the video is selected by a user, wherein the region of interest selected by the user is presented on the device. A region of interest of the video is selected by a user, wherein the region of interest selected by the user is presented on a second device. A region of interest of the video is selected by a director, wherein the region of interest selected by the director is presented on the device of a user. The video is encoded with independently decodable tiles and in one or more resolution layers and stored on a server. Different users request different resolution layers of the video. Different directors request different resolution layers of the video. The supplemental enhancement information message indicates coding tree blocks outside a selected region of interest, wherein the coding tree blocks outside the selected region of interest are not displayed. The supplemental enhancement information message indicates coding tree blocks outside a selected region of interest, wherein the coding tree blocks outside the selected region of interest are encoded as gray tiles to reduce bitrate.

In yet another aspect, a method programmed in a non-transitory memory of a device comprises receiving a bitstream of a video with a base layer and one or more enhancement layers, wherein the bitstream includes a supplemental enhancement information message of an enhancement layer, further wherein the supplemental information message is utilized with inter layer constrained tile sets which can signal all tiles are independently decodable of any other tiles in the layer and that regions of interest have more than one tile per region of interest in the layer; and decoding the bitstream on the device. A region of interest of the video is selected by a user, wherein the region of interest selected by the user is presented on the device. A region of interest of the video is selected by a user, wherein the region of interest selected by the user is presented on a second device. A region of interest of the video is selected by a director, wherein the region of interest selected by the director is presented on the device of a user. Different users request different resolution layers of the video. Different directors request different resolution layers of the video.

In another aspect, a system comprises a non-transitory memory configured for storing an application, the application configured for: receiving a bitstream of a video with a base layer and one or more enhancement layers, wherein the bitstream includes a supplemental enhancement information message of an enhancement layer, further wherein the supplemental information message is utilized with inter layer constrained tile sets which can signal all tiles are independently decodable of any other tiles in the layer and that regions of interest have more than one tile per region of interest in the layer and decoding the bitstream and a display configured for displaying the decoded bitstream. A region of interest of the video is selected by a user, wherein the region of interest selected by the user is presented on the device. A region of interest of the video is selected by a user, wherein the region of interest selected by the user is presented on a second device. A region of interest of the video is selected by a director, wherein the region of interest selected by the director is presented on the device of a user. Different users request different resolution layers of the video. Different directors request different resolution layers of the video.

In another aspect, an apparatus comprises a non-transitory memory for storing an application, the application for: receiving a bitstream of a video with a base layer and one or more enhancement layers, wherein the bitstream includes a supplemental enhancement information message of an enhancement layer, further wherein the supplemental information message is utilized with inter layer constrained tile sets which can signal all tiles are independently decodable of any other tiles in the layer and that regions of interest have more than one tile per region of interest in the layer and decoding the bitstream and a processing component coupled to the memory, the processing component configured for processing the application. A region of interest of the video is selected by a user, wherein the region of interest selected by the user is presented on the device. A region of interest of the video is selected by a user, wherein the region of interest selected by the user is presented on a second device. A region of interest of the video is selected by a director, wherein the region of interest selected by the director is presented on the device of a user. Different users request different resolution layers of the video. Different directors request different resolution layers of the video.

DETAILED DESCRIPTION OF THE PREFERRED EMBODIMENT

In version 1 of the High Efficiency Video Coding (HEVC) standard, when tiles_enabled_flag is equal to 1, each picture is constructed of rectangular regions known as tiles. In the Range Extensions text specification: Draft 3, these tiles are able to be collected to form a collection of tile sets known as Regions of Interest (ROIs). The tile sets are able to be indicated as independently decodable by the motion-constrained tile sets Supplemental Enhancement Information (SEI) messages.

Such HEVC tile structure is able to be applied to interactive tile streaming. An example of tiled streaming is an application where a multi-resolution panorama video is able to be split into videos which are composed of different ROIs and resolutions.

An extension to the motion-constrained tile sets SEI message provides functionality to signal all tiles are independently decodable and to signal the ROIs that may have more than one tile per ROI. With this extension, the functionality to redefine any independently decodable region-of-interest in a Coded Video Stream (CVS) at tile level based on user or director interactivity is enabled. A director is a person who controls content and/or is able to modify the content (e.g., content is modified depending on the group of users it is sent to). The extension supports the interactivity utilized in various applications such as interactive Ultra High Definition Television (UHDTV), dynamic high-quality zoom-in application, interactive on-demand, e-learning, smart surveillance and many other applications.

An ROI is defined as a union of one or more tiles. The extension described herein is used to signal ROIs based on a user or director interactively for a single layer video, or a video with a base layer and at least one enhancement layer. There is a mapping of an ROI in the enhancement layer to an ROI in the base layer. There is also a mapping of an ROI in the base layer to the ROI in the enhancement layer.

The extension described herein signals the motion constrained tile sets for multiple layer video with spatial scalability and/or Signal-to-Noise Ratio (SNR) scalability in the following cases. The motion constrained tile sets with the extension described herein are applied to the enhancement layer (e.g., every tile in the enhancement layer is independently decodable from other tiles in the enhancement layer). Both, the base layer and the enhancement layer, have motion constrained tile sets. Every tile in the base layer is independently decodable. Every tile in the enhancement layer is independently decodable from other tiles in the enhancement layer. A tile in the enhancement layer may depend on one or more tiles in the base layer. There is a mapping of an ROI in the enhancement layer to an ROI in the base layer in the decoding process. There is a mapping of an ROI in the base layer to an ROI in the enhancement layer in the decoding process.

Figure 1:
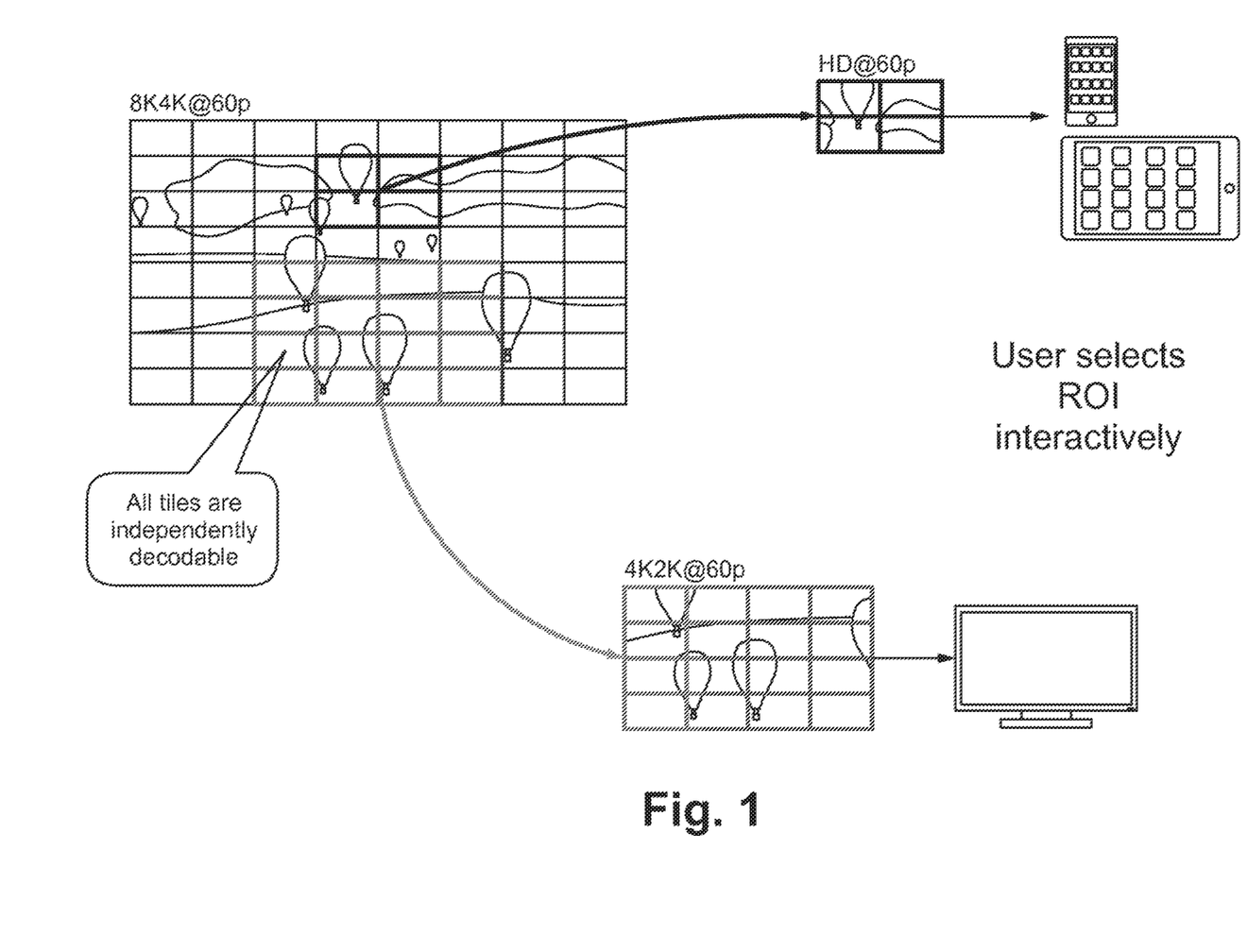
FIG. 1 illustrates an example of tiled streaming according to some embodiments.

FIG. 1 illustrates a diagram of tiled streaming according to some embodiments. A user is able to interactively select an ROI. After the user selects the ROI, the selected ROI is presented on a device (e.g., television, smart phone, tablet). All of the tiles are independently decodable, since a different user may want a different ROI. It is important to reduce complexity to serve all users by avoiding CTU-level transcoding. In FIG. 1, a panorama video is encoded with independently decodable tiles and in multiple resolution layers on the server side. One of the resolution layers on the server side is 8K by 4K. Different viewers are able to request the server to send different ROIs from different resolution layers of the panorama video. In FIG. 1, one client requests a region to be viewed on the client's HD mobile device from one of the resolution layers. Another client requests a different region to be viewed on the client's 4K TV from the same resolution layer. In general, the clients are able to selectively view any ROIs at one of several spatial resolutions. FIG. 1 shows user interactivity with the server at one of the resolution layers.

There are several properties for tiled streaming. All tiles are independently decodable (motion-constrained tiles). The ROIs are not necessarily determined at the beginning of the encode time of a CVS. Once the ROIs are encoded in a CVS, they are able to be modified or re-defined based on user interactivity without re-encoding the CVS at the CTU level.

The motion-constrained tile sets (MCTS) SEI is able to be used to signal the location of independently decodable ROIs. But, in general, MCTS SEJ cannot signal the following at the same time: all tiles are independently decodable and the locations of the ROIs. The extension described herein enables MCTS to support all tiles being independently decodable and to signal the locations of the ROIs.

Table 1 shows the MCTS syntax with the extension

|  | Descriptor |
|---|---|
| motion_constrained_tile_sets(payloadSize) { |  |
|     all_tiles_exact_sample_value_match_flag | u(1) |
|     one_tile_per_tile_set_flag | u(1) |
|     if (!one_tile_per_tile_set_flag) { |  |
|     num_sets_in_message_minus1 | ue(v) |
|     for (i=0; i<=num_sets_in_message_minus1; i++) { |  |
|         mcts_id[i] | ue(v) |
|         num_tile_rects_in_set_minus1[i] | ue(v) |
|         for (j=0; j<=num_tile_rects_in_set_minus1[i]; j++) { |  |
|             top_left_tile_index [i][j] | ue(v) |
|             bottom_right_tile_index[i][j] | ue(v) |
|         } |  |
|         if(!all_tiles_exact_sample_value_match_flag) { |  |
|             exact_sample_value_match_flag[i] | u(1) |
|         } |  |
|     } |  |
|     } |  |
| } |  |

The all_tiles_exact_sample_value_match_flag is similar to the definition of exact_sample value_match_flag for a motion-constrained tile set, but applies to every tile. all_tiles_exact_sample_value_match_flag equal to 0 indicates that within the coded video sequence, when the coding tree blocks are outside a motion constrained tile set are not decoded and the boundaries of the motion constrained tile set are treated as picture boundaries for purposes of the decoding process, the value of each sample in the motion constrained tile set may not be exactly the same as the value of the same sample when all of the coding tree blocks of the picture are decoded. The all_tiles_exact_sample_value_match_flag equal to 1 indicates that within the coded video sequence, when the coding tree blocks that do not belong to a motion constrained tile set are not decoded and the boundaries of the motion constrained tile set are treated as picture boundaries for purposes of the decoding process, the value of each sample in the motion constrained tile set would be exactly the same as the value of the sample that would be obtained when all the coding tree blocks of all pictures in the coded video sequence are decoded.

one_tile_per_tile set_flag equal to 1 indicates that each tile forms a tile set.

A similar extension to the motion-constrained tile sets SEI message is also able to be applied to the inter layer constrained tile sets (ILCTS) in JCTVC-N0087. In particular, the syntax of JCTVC-N0087 for interlayer does not have the capability to signal ROIs when every tile is a tile set, and it is extended as in Table 2.

Inter Layer Constrained Tile Sets
Table 2 shows modified inter-layer syntax

| | Descriptor |
|---|---|
| inter_layer_constrained_tile_sets(payloadSize) { | |
|     il_all_tiles_exact_sample_value_match_flag | u(1) |
|     il_one_tile_per_tile_set_flag | u(1) |
|     if (!il_one_tile_per_tile_set_flag) { | |
|         il_num_sets_in_message_minus1 | ue(v) |
|         if(il_num_sets_in_message_minus1) | |
|             skipped_tile_set_present_flag | u(1) |
|         numSignificantSets = il_num_sets_in_message_minus1 − skipped_tile_set_present_flag + 1 | |
|         for (i=0; i<numSignificantSets; i++) { | |
|             ilcts_id[i] | ue(v) |
|             il_num_tile_rects_in_set_minus1[i] | ue(v) |
|             for (j=0; j<=il_num_tile_rects_in_set_minus1[i]; j++) { | |
|                 il_top_left_tile_index [i][j] | ue(v) |
|                 il_bottom_right_tile_index[i][j] | ue(v) |
|             } | |
|         ilc_idc[i] | u(2) |
|         if(!il_all_tiles_exact_sample_value_match_flag) { | |
|             il_exact_sample_value_match_flag[i] | u(1) |
|         } | |
|     } else | |
|         all_tiles_ilc_idc | u(2) |
| } | |

The scope of the inter-layer constrained tile sets SEI message is a complete CLVS of the layer with nuh_layer_id equal to targetLayerId. When an inter-layer tile sets SEI message is present for any coded picture of a CLVS and the first coded picture of the CLVS in decoding order is an IRAP picture, the inter-layer tile sets SEI message shall be present for the first coded picture of the CLVS in decoding order and may also be present for other coded pictures of the CLVS. The inter-layer constrained tile sets SEI message shall not be present for the layer with nuh_layer_id equal to targetLayerId when tiles_enabled_flag is equal to 0 for any PPS that is active for the layer.

The inter-layer constrained tile sets SEI message shall not be present for the layer with nuh_layer_id equal to targetLayerId unless every PPS that is active for the pictures of the CLVS of the layer with nuh_layer_id equal to targetLayerId has tile_boundaries_aligned_flag equal to 1 or fulfills the conditions that would be indicated by tile_boundaries_aligned_flag being equal to 1.

An identified tile set is defined as a set of tiles within a picture with nuh_layer_id targetLayerId that contains the tiles specified below on the basis of the values of the syntax elements contained in the inter-layer constrained tile sets SEI message.

An associated reference tile set for the iPred-th identified tile set with ilcts_id[iPred] equal to ilctsId, if any, is defined as the identified tile set present in the same access unit as the iPred-th identified tile set and associated with ilcts_id[iRef] equal to ilctsId and nuh_layer_id equal to RefLayerId[targetLayerId][j] for any value of j in the range of 0 to NumDirectRefLayers[targetLayerId]−1, inclusive.

The presence of the inter-layer constrained tile sets SEI message indicates that the inter-layer prediction process is constrained such that no sample value outside each associated reference tile set, and no sample value at a fractional sample position that is derived using one or more sample values outside each associated reference tile set, is used for inter-layer prediction of any sample within the identified tile set.

When loop filtering and resampling filter is applied across tile boundaries, inter-layer prediction of any samples within an identified tile set that refers to samples within 8 samples from an associated reference tile set boundary that is not also a picture boundary may result in propagation of mismatch error. An encoder can avoid such potential error propagation by avoiding the use of motion vectors that cause such references.

When more than one inter-layer constrained tile sets SEI message is present for a CLVS, they shall contain identical content.

The number of inter-layer constrained tile sets SEI messages for the same CLVS in each access unit shall not exceed 5.

il_all_tiles_exact_sample_value_match_flag equal to equal to 1 indicates that, within the CLVS, when the coding tree blocks that are outside of any tile in any identified tile set specified in this inter-layer constrained tile sets SEI message are not decoded and the boundaries of the tile is treated as picture boundaries for purposes of the decoding process, the value of each sample in the tile would be exactly the same as the value of the sample that would be obtained when all the coding tree blocks of all pictures in the CLVS are decoded.

il_all tiles_exact_sample_value_match_flag equal to 0 indicates that, within the CLVS, when the coding tree blocks that are outside of any tile in any identified tile set specified in this inter-layer constrained tile sets SEI message are not decoded and the boundaries of the tile is treated as picture boundaries for purposes of the decoding process, the value of each sample in the tile may or may not be exactly the same as the value of the same sample when all the coding tree blocks of all pictures in the CLVS are decoded.

il_one tile_per_tile_set_flag equal to 1 indicates that each identified tile set contains one tile, and il_num_sets_in_message_minus1 is not present. When il_one_tile_per_tile_set_flag is equal to 1, the following applies:
    (num_tile_columns_minus1+1)*(num_tile_rows_minus1+1) shall be less than or equal to 256.
    The value of ilcts_id[i] for the i-th tile in tile raster scan order in the range of 0 to (num_tile_columns_minus1+1)*(num_tile_rows_minus1+1)−1, inclusive, is inferred to be equal to 256+i.

When il_one_tile_per_tile_set_flag is equal to 0, the identified tile sets are signalled explicitly. il_num_sets_in_message_minus1 plus 1 specifies the number of inter-layer identified tile sets in the SEI message. The value of il_num_sets_in_message_minus1 shall be in the range of 0 to 255, inclusive.

skipped_tile_set_present_flag equal to 1 indicates that, within the CLVS, the il_num_sets_in_message_minus1-th identified tile set consists of those remaining tiles that are not included in any earlier identified tile sets in the same message and all the prediction blocks that are inside the il_num_sets_in_message_minus1-th identified tile set are inter-layer predicted from inter-layer reference pictures with nuh_layer_id equal to RefLayerId[targetLayerId][NumDirectRefLayers[targetLayerId]−1] and no residual_coding( ) syntax structure is present in any transform unit of the il_num_sets_in_message_minus1-th identified tile set. skipped_tile_set_present_flag equal to 0 does not indicate a bitstream constraint within the CLVS. When not present, the value of skipped_tile_set_present_flag is inferred to be equal to 0. ilcts_id[i] contains an identifying number that may be used to identify the purpose of the i-th identified tile set (for example, to identify an area to be extracted from the coded video sequence for a particular purpose). The value of ilcts_id[i] shall be in the range of 0 to $2^{32}-2$, inclusive. Values of ilcts_id[i] from 0 to 255, inclusive, and from 512 to $2^{31}-1$, inclusive, may be used as determined by the application. If il_one_tile_per_tile_set_flag is equal to 1, values of ilcts_id[i] from 256 to 511, inclusive are used for the inferred ilcts_id[i] values as specified above. Otherwise, values of ilcts_id[i] from 256 to 511, inclusive, are reserved for future use by ITU-T|ISO/IEC. Values of ilcts_id[i] from $2^{31}$ to $2^{32}-2$, inclusive, are reserved for future use by ITU-T|ISO/IEC. Decoders encountering an indicated value of ilcts_id[i] in the range of 256 to 511, inclusive, or in the range of $2^{31}$ to $2^{32}-2$. inclusive, shall ignore (remove from the bitstream and discard) it.

il_num_tile_rects_in_set_minus1[i] plus 1 specifies the number of rectangular regions of tiles in the i-th identified tile set. The value of il_num_tile_rects_in_set_minus1[i] shall be in the range of 0 to (num_tile_columns_minus1+1)*(num_tile_rows_minus1+1)−1, inclusive.

il_top_left_tile_index[i][j] and il_bottom_right_tile_index[i][j] identify the tile position of the top-left tile and the tile position of the bottom-right tile in a rectangular region of the i-th identified tile set, respectively, in tile raster scan order.

ilc_idc[i] equal to 1 indicates that no samples outside of the any associated reference tile set and no samples at a fractional sample position that is derived using one or more samples outside of any associated reference tile set are used for inter-layer prediction of any sample within.

ilc_idc[i] equal to 2 indicates that no prediction block in the i-th identified tile set is predicted from an inter-layer reference picture. ilc_idc[i] equal to 0 indicates that the inter-layer prediction process may or may not be constrained for the prediction block in the i-th identified tile set. The value of ilc_idc[i] equal to 3 is reserved.

il_exact_sample_value_match_flag[i] equal to 1 indicates that, within the CLVS, when the coding tree blocks that do not belong to the i-th identified tile set are not decoded and the boundaries of the i-th identified tile set are treated as picture boundaries for the purposes of the decoding process, the value of each sample in the i-th identified tile set would be exactly the same as the value of the sample that would be obtained when all the coding tree blocks of all pictures in the CLVS are decoded. il_exact_sample_value_match_flag[i] equal to 0 indicates that, within the CLVS, when the coding tree blocks that are outside of the i-th identified inter-layer constrained tile set are not decoded and the boundaries of the i-th identified tile set are treated as picture boundaries for the purposes of the decoding process, the value of each sample in the i-th identified tile set may or may not be exactly the same as the value of the same sample when all the coding tree blocks of all pictures in the CLVS are decoded.

It is feasible to use il_exact_sample_value_match_flag equal to 1 when using certain combinations of loop_filter_across_tiles_enabled_flag, pps_loop_filter_across_slices_enabled_flag, pps_deblocking_filter_disabled_flag, slice_loop_filter_across_slices_enabled_flag, slice_deblocking_filter_disabled_flag, sample_adaptive_offset_enabled_flag, slice_sao_luma_flag, and slice_sao_chroma_flag. all_tiles_ilc_idc equal to 1 indicates that, for each identified tile set within the CLVS, no sample value outside of each associated reference tile set and no sample value at a fractional sample position that is derived using one or more samples outside of each associated reference tile set is used for inter-layer prediction of any sample within the identified tile set. all_tiles_ilc_idc equal to 2 indicates that, within the CLVS, no prediction block in each identified tile set is predicted from an inter-layer reference picture. all_tiles_ilc_idc equal to 0 indicates that, within the CLVS, the inter-layer prediction process may or may not be constrained for the identified tile sets. The value of all_tiles_ilc_idc equal to 3 is reserved. When all_tiles_ild_idc is not present, it is inferred to be equal to 0.

Temporal Motion Constrained Tile Sets (Temporal MCTS)

The temporal motion constrained tile sets (Temporal MCTS) SEI message in JCTVC-O1005 is able to be extended to signal that the coding tree blocks outside of the ROI should not be displayed. With this extension, the temporal motion constrained tile sets SEI message is able to be used by an encoder for tiled streaming to signal explicitly to the decoder that the decoder need only to display the ROI. The Temporal MCTS SEI message is able to be used for tile streaming. For the example of tiled streaming, a panorama video is encoded in the server side with independently decodable tiles, only a subset of the tiles is requested by the client decoder as ROI by gray tiles (or tiles that are able to be encoded very efficiently such as low bitrate content) and signal the decoder not to display the gray tiles (or the efficiently coded tiles).

When a decoder receives the modified Temporal MCTS SEI messages that signal not to display outside the ROI, the decoder is able to choose to: 1) not display the area outside the ROI, 2) replace the area outside the ROI with a predetermined color. The color is able to be used for chroma keying for displaying with other content.

Figure 2:
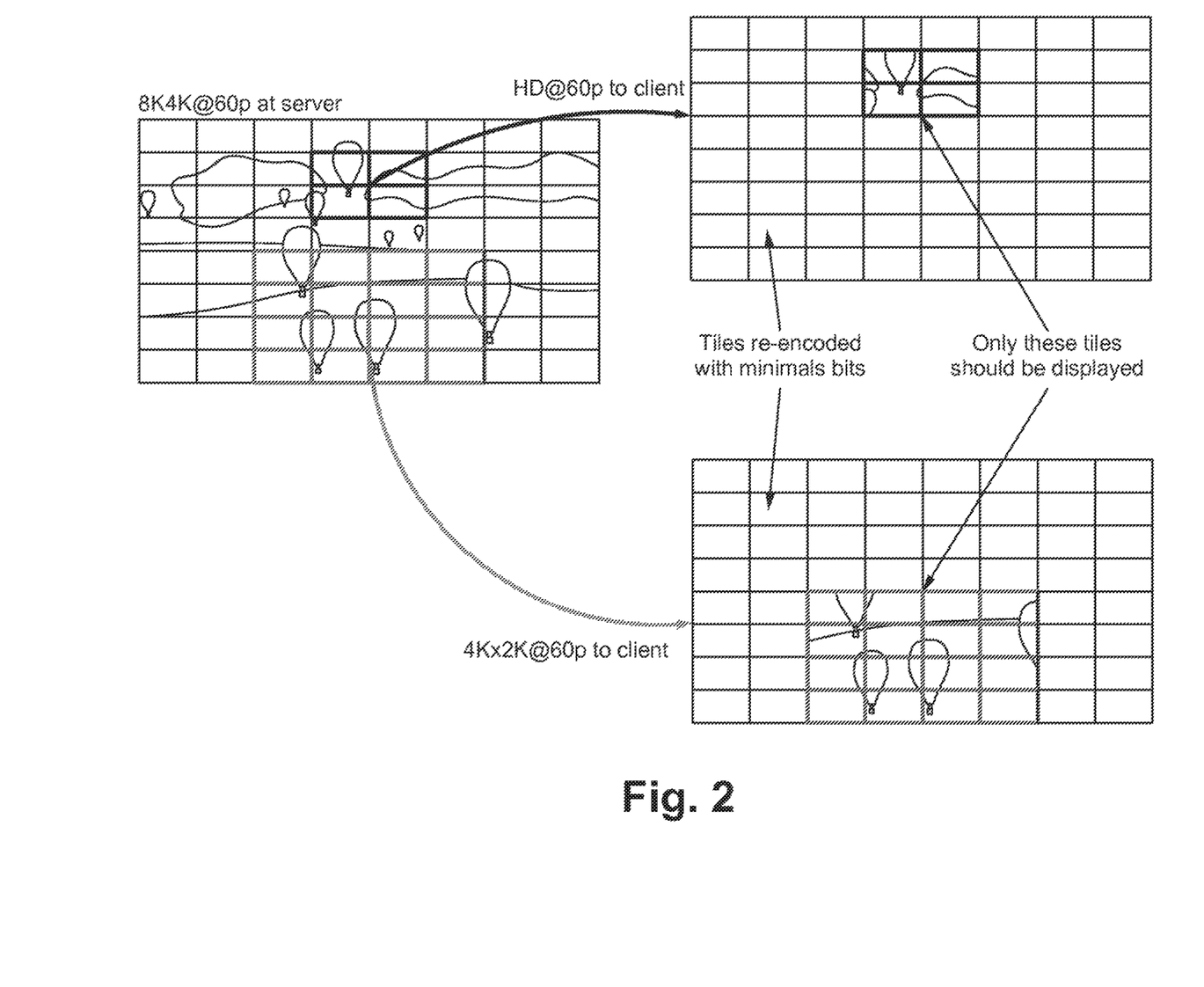
FIG. 2 illustrates a diagram of re-encoding tiles outside the ROI with minimal bits according to some embodiments.

FIG. 2 illustrates a panorama video is encoded on the server side with independently decodable tiles, only a subset of the tiles is requested by the client decoder as ROI for display purposes. To reduce transmission bandwidth, the server is able to replace the tiles outside the RO with gray tiles and signal the decoder not to display the gray tiles. Further, different clients are able to request different ROIs to be streamed from the server.

The temporal MCTS SEI message is able to be modified in a number of ways. Several possible embodiments are described herein. In some embodiments, whether to display the coding tree blocks outside the ROIs is signaled in a bitstream.

Table 3 shows the modified syntax of a temporal motion constrained tile sets function.

| | Descriptor |
|---|---|
| temporal_motion_constrained_tile_sets(payloadSize) { | |
|     mc_all_tiles_exact_sample_value_match_flag | u(1) |
|     each_tile_one_tile_set_flag | u(1) |
|     display_tile_sets_only_flag | u(1) |
|     if (!each_tile_one_tile_set_flag) { | |
|         num_sets_in_message_minus1 | ue(v) |
|         for (i=0; i<=num_sets_in_message_minus1; i++) { | |
|             mcts_id[i] | ue(v) |
|             num_tile_rects_in_set_minus1[i] | ue(v) |
|             for (j=0; j<=num_tile_rects_in_set_minus1[i]; j++) { | |
|                 top_left_tile_index [i][j] | ue(v) |
|                 bottom_right_tile_index[i][j] | ue(v) |
|             } | |
|             if(!mc_all_tiles_exact_sample_value_match_flag) { | |
|                 exact_sample_value_match_flag[i] | u(1) |
|             } | |
|         } | |
|     } | |
| } | |

Display_tile_sets_only_flag equal to 1 specifies that all coding tree blocks in all tile sets should be displayed and all coding tree blocks not in any tile set should not be displayed. Display_tile_set_only_flag equal to 0 indicates that this flag should be ignored.

Table 4 shows the modified syntax of a temporal motion constrained tile sets function.

| | Descriptor |
|---|---|
| temporal_motion_constrained_tile_sets(payloadSize) { | |
|     mc_all_tiles_exact_sample_value_match_flag | u(1) |
|     each_tile_one_tile_set_flag | u(1) |
|     no_display_outside_tile_sets_flag | u(1) |
|     if (!each_tile_one_tile_set_flag) { | |
|         num_sets_in_message_minus1 | ue(v) |
|         for (i=0; i<=num_sets_in_message_minus1; i++) { | |
|             mcts_id[i] | ue(v) |
|             num_tile_rects_in_set_minus1[i] | ue(v) |
|             for (j=0; j<=num_tile_rects_in_set_minus1[i]; j++) { | |
|                 top_left_tile_index [i][j] | ue(v) |
|                 bottom_right_tile_index[i][j] | ue(v) |
|             } | |
|             if(!mc_all_tiles_exact_sample_value_match_flag) { | |
|                 exact_sample_value_match_flag[i] | u(1) |
|             } | |
|         } | |
|     } | |
| } | | no_display_outside_tile_sets_flag equal to 1 specifies that all coding tree blocks not in any tile set should not be displayed. no_display_outside_tile_sets_flag equal to 0 indicates that this flag should be ignored.

In some embodiments, the syntax of temporal_motion_constrained_tile_sets and the inter_layer_constrained_tile_sets are aligned. In particular, the no_display_last_tile_set_flag plays a parallel role to the skipped_tile_set_present_flag in the inter layer constrained_tile_sets SEI message.

Table 5 shows the modified syntax of a temporal motion constrained tile sets function.

| | Descriptor |
|---|---|
| temporal_motion_constrained_tile_sets(payloadSize) { | |
|     mc_all_tiles_exact_sample_value_match_flag | u(1) |
|     each_tile_one_tile_set_flag | u(1) |
|     if (!each_tile_one_tile_set_flag) { | |
|         num_sets_in_message_minus1 | ue(v) |
|         if(num_sets_in_message_minus1) | |
|             no_display_last_tile_set_flag | u(1) |
|         numSignificantSets = num_sets_in_message_minus1 − | |

| | Descriptor |
|---|---|
| non_signficant_tile_set_present_flag + 1 | |
|     for (i=0; i<=numSignificantSets; i++) { | |
|         mcts_id[i] | ue(v) |
|         num_tile_rects_in_set_minus1[i] | ue(v) |
|         for (j=0; j<=num_tile_rects_in_set_minus1[i]; j++) { | |
|             top_left_tile_index [i][j] | ue(v) |
|             bottom_right_tile_index[i][j] | ue(v) |
|         } | |
|         if(!mc_all_tiles_exact_sample_value_match_flag) { | |
|             exact_sample_value_match_flag[i] | u(1) |
|         } | |
|     } | |
| } | | no_display_last_tile_set_flag equal to 1 specifies that the last tile includes those tiles that are not included in any earlier tile sets in the same message and the last tile should not be displayed. no_display_last_tile_set_flag equal to 0 indicates that the last tile set may or may not include those tiles that are not included in any earlier tile sets in the same message.

In some embodiments, only a single tile set is displayed. Table 6 shows the modified syntax of a temporal motion constrained tile sets function.

| | Descriptor |
|---|---|
| temporal_motion_constrained_tile_sets(payloadSize) { | |
|     mc_all_tiles_exact_sample_value_match_flag | u(1) |
|     each_tile_one_tile_set_flag | u(1) |
|     if (!each_tile_one_tile_set_flag) { | |
|         num_sets_in_message_minus1 | ue(v) |
|     for (i=0; i<=num_sets_in_message_minus1; i++) { | |
|         mcts_id[i] | ue(v) |
|         num_tile_rects_in_set_minus1[i] | ue(v) |
|         for (j=0; j<=num_tile_rects_in_set_minus1[i]; j++) { | |
|             top_left_tile_index [i][j] | ue(v) |
|             bottom_right_tile_index[i][j] | ue(v) |
|         } | |
|         if(!mc_all_tiles_exact_sample_value_match_flag) { | |
|             exact_sample_value_match_flag[i] | u(1) |
|         } | |
|     } | |
|     single_tile_set_display_flag | u(1) |
|     if(single_tile_set_display_flag) | |
|         display_tile_set_idc | ue(v) |
| } | | single_tile_set_display_flag equal to 1 specifies that the display_tile_set_idc_syntax element is present. single_tile_set_display_flag equal to 0 specifies that the display_tile_set_idc syntax element is not present.

display_tile_set_idc, when present, indicates that only the display_tile_set_idc-th tile set is intended for display. display_tile_set_idc shall be in the range of 0 to num_sets_in_message_minus1.

Table 7 shows the modified syntax of a temporal motion constrained tile sets function.

| | Descriptor |
|---|---|
| temporal_motion_constrained_tile_sets(payloadSize) { | |
|     mc_all_tiles_exact_sample_value_match_flag | u(1) |
|     each_tile_one_tile_set_flag | u(1) |
|     if (!each_tile_one_tile_set_flag) { | |
|         limited_tile_set_display_flag | u(1) |
|         num_sets_in_message_minus1 | ue(v) |
|     for (i=0; i<=num_sets_in_message_minus1; i++) { | |
|         mcts_id[i] | ue(v) |

-continued

| | Descriptor |
|---|---|
| ``if (limited_tile_set_display_flag)``<br>``    display_tile_set_flag[i]`` | |
| ``num_tile_rects_in_set_minus1[i]`` | ue(v) |
| ``for (j=0; j<=num_tile_rects_in_set_minus1[i]; j++) {`` | |
| ``    top_left_tile_index [i][j]`` | ue(v) |
| ``    bottom_right_tile_index[i][j]`` | ue(v) |
| ``}`` | |
| ``if(!mc_all_tiles_exact_sample_value_match_flag) {`` | |
| ``    exact_sample_value_match_flag[i]`` | u(1) |
| ``    }`` | |
| ``}`` | |
| ``}`` | | limited_tile_set_display flag equal to 1 specifies that the display_tile_set_flag[i] syntax element is present and indicates that the tiles not included within any tile set with display_tile_set_flag[i] equal to 1 are not intended for display. limited_tile_set_display flag equal to 0 specifies that the display_tile_set_flag[i] syntax element is not present. display_tile_set_flag[i] equal to 1 indicates that the i-th tile set is intended for display. display_tile_set_flag[i] equal to 0 indicates that the i-th tile set is not intended for display. When not present, the value of display_tile_set_flag[i] is inferred to be equal to 1.

Figure 3:
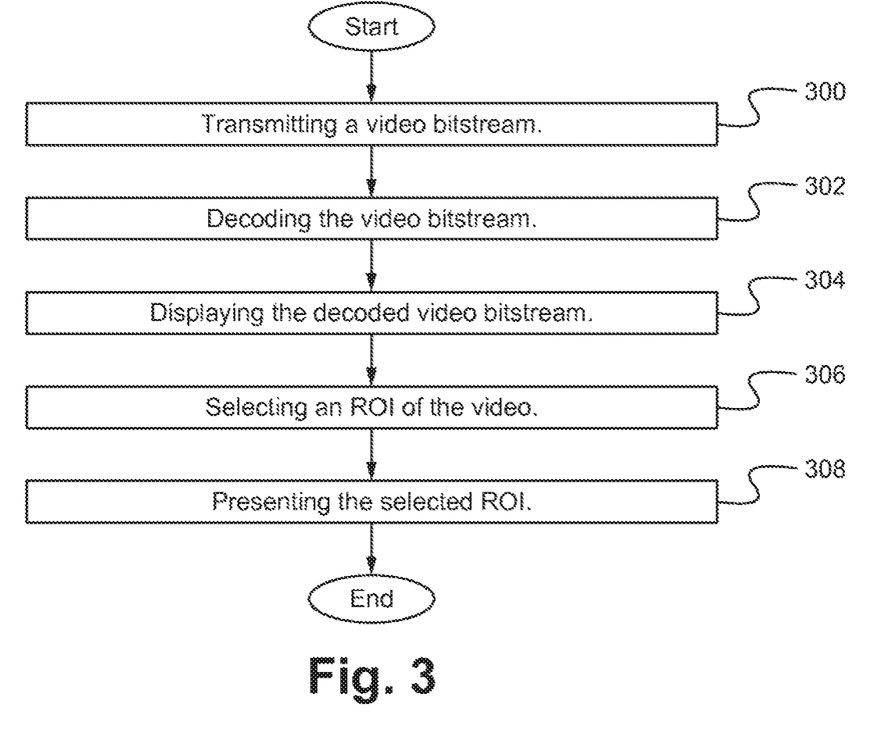
FIG. 3 illustrates a flowchart of a method of tiled streaming according to some embodiments.

FIG. 3 illustrates a flowchart of a method of tiled streaming according to some embodiments. In the step 300, a video bitstream is transmitted from a device (e.g., server) to a second device (e.g., television). The video bitstream includes an SEI message with the extensions described herein. The SEI message is capable of signaling that all tiles are independently decodable of other tiles. In the step 302, the video bitstream is decoded. In the step 304, the decoded video is displayed. In the step 306, a user selects an ROI of the video for interactivity purposes. In the step 308, the selected ROI is presented to the user. In some embodiments, fewer or additional steps are implemented. In some embodiments, the order of the steps is modified.

Figure 4:
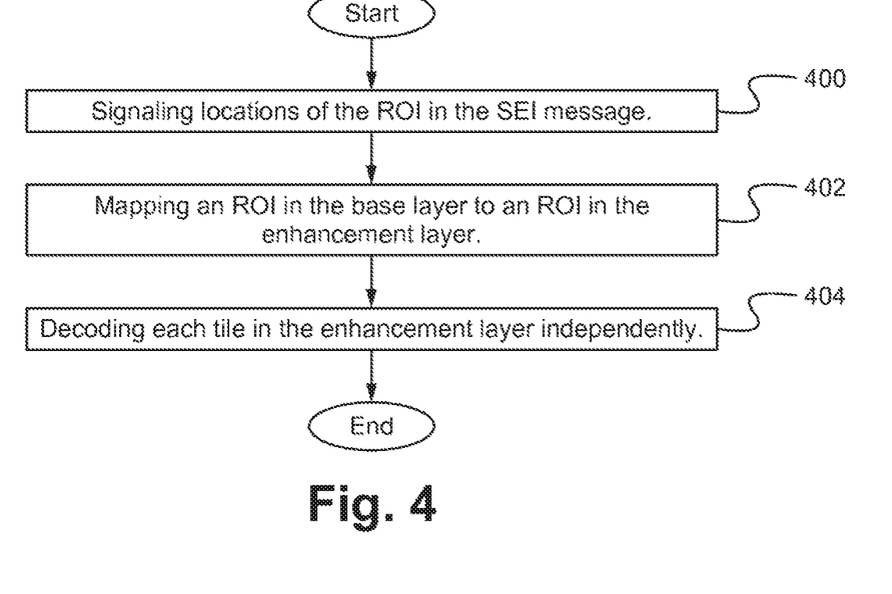
FIG. 4 illustrates a flowchart of a method of tiled streaming according to some embodiments.

FIG. 4 illustrates a flowchart of a method of tiled streaming according to some embodiments. In the step 400, locations of ROIs are signaled in an MCTS SEI message. In the step 402, an ROI in the base layer is mapped to an ROI in the enhancement layer in the video decoding process. In the step 404, each tile in the enhancement layer is decoded independent from other tiles in the MCTS of the enhancement layer. In some embodiments, fewer or additional steps are implemented.

Figure 5:
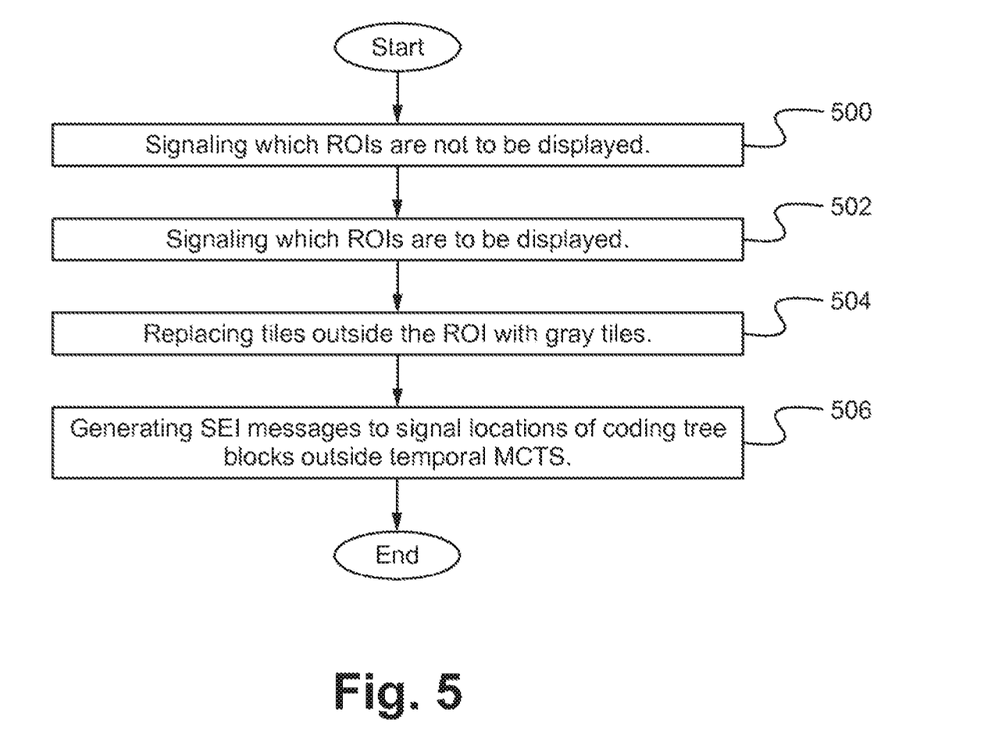
FIG. 5 illustrates a flowchart of a method of tiled streaming according to some embodiments.

FIG. 5 illustrates a flowchart of a method of tiled streaming according to some embodiments. In the step 500, the decoder is signaled as to which ROIs are not to be displayed. In the step 502, the decoder is signaled as to which ROIs are to be displayed (e.g., an ROI selected by a user). In the step 504, tiles outside the ROI to be displayed are replaced with gray tiles to reduce bandwidth. In the step 506, SEI messages are generated to signal locations of coding tree blocks outside temporal motion constrained tile sets. In some embodiments, fewer or additional steps are implemented. In some embodiments, steps of FIGS. 3, 4 and 5 are able to be implemented together. For example, although the step 500 is shown in FIG. 5, the step 500 is able to be implemented with the steps of FIG. 3.

Figure 6:
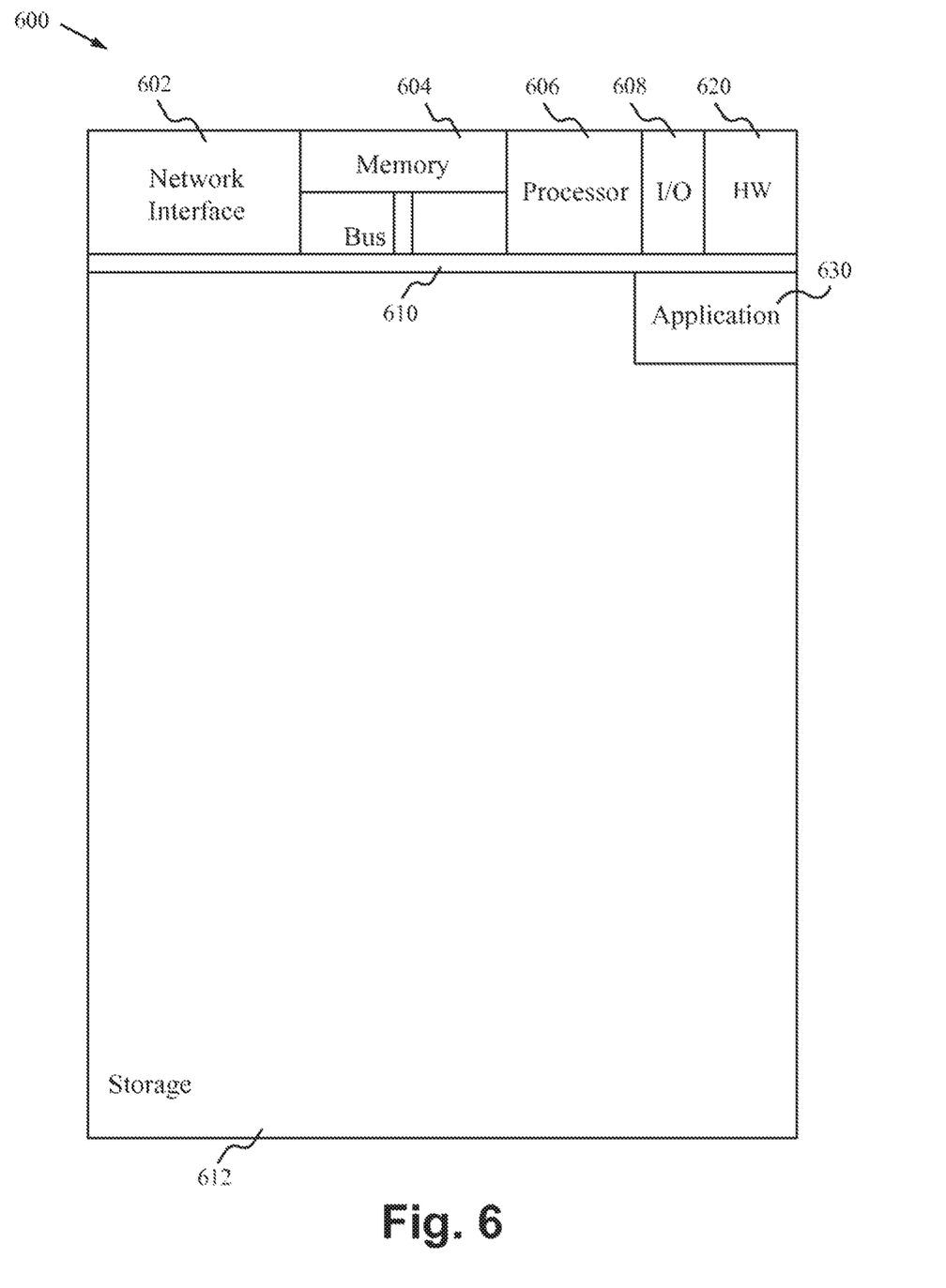
FIG. 6 illustrates a block diagram of an exemplary computing device configured to implement the tiled streaming method according to some embodiments.

FIG. 6 illustrates a block diagram of an exemplary computing device configured to implement the tiled streaming method according to some embodiments. The computing device 600 is able to be used to acquire, store, compute, process, communicate and/or display information such as images and videos. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, High Definition disc/drive, ultra-HD drive, flash memory card or any other storage device. The computing device 600 is able to include one or more network interfaces 602. An example of a network interface includes a network card connected to an Ethernet or other type of LAN. The V/O device(s) 608 are able to include one or more of the following: keyboard, mouse, monitor, screen, printer, modem, touchscreen, button interface and other devices. Tiled streaming application(s) 630 used to perform the tiled streaming method are likely to be stored in the storage device 612 and memory 604 and processed as applications are typically processed. More or fewer components shown in FIG. 6 are able to be included in the computing device 600. In some embodiments, tiled streaming hardware 620 is included. Although the computing device 600 in FIG. 6 includes applications 630 and hardware 620 for the tiled streaming method, the tiled streaming method is able to be implemented on a computing device in hardware, firmware, software or any combination thereof. For example, in some embodiments, the tiled streaming applications 630 are programmed in a memory and executed using a processor. In another example, in some embodiments, the tiled streaming hardware 620 is programmed hardware logic including gates specifically designed to implement the tiled streaming method.

In some embodiments, the tiled streaming application(s) 630 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

To utilize the tiled streaming method, a device such as a digital video camera is able to be used to acquire a video. The tiled streaming method is automatically implemented during or after acquiring a video such as during playback of the video. The tiled streaming method is able to be implemented automatically without user involvement.

In operation, the tiled streaming method enables users to interactively select portions of an image/video. The extension supports the interactivity utilized in various applications such as interactive Ultra High Definition Television (UHDTV), dynamic high-quality zoom-in application, interactive on-demand, e-learning, smart surveillance and many other applications.

Some Embodiments of Extensions of Motion-Constrained Tile Sets SEI Message for Interactivity 1. A method programmed in a non-transitory memory of a device comprising:
   a. receiving a bitstream of a video, wherein the bitstream includes a supplemental enhancement information message, further wherein the supplemental information message signals all tiles are independently decodable and that regions of interest are able to have more than one tile per region of interest; and
   b. decoding the bitstream on the device.
2. The method of clause 1 wherein all tiles in a base layer of the video are independently decodable.
3. The method of clause 1 wherein all tiles in an enhancement layer of the video are independently decodable.
4. The method of clause 1 wherein decoding includes providing a mapping of a region of interest in an enhancement layer to the region of interest in a base layer.
5. The method of clause 1 wherein decoding includes providing a mapping of a region of interest in a base layer to the region of interest in an enhancement layer.
6. The method of clause 1 wherein a region of interest of the video is selected by a user, wherein the region of interest selected by the user is presented on the device.
7. The method of clause 1 wherein a region of interest of the video is selected by a user, wherein the region of interest selected by the user is presented on a second device.
8. The method of clause 1 wherein a region of interest of the video is selected by a director, wherein the region of interest selected by the director is presented on the device of a user.
9. The method of clause 1 wherein the video is encoded with independently decodable tiles and in one or more resolution layers and stored on a server.
10. The method of clause 1 wherein different users request different resolution layers of the video.
11. The method of clause 1 wherein different directors request different resolution layers of the video.
12. The method of clause 1 wherein the supplemental enhancement information message indicates coding tree blocks outside a selected region of interest, wherein the coding tree blocks outside the selected region of interest are not displayed.
13. The method of clause 1 wherein the supplemental enhancement information message indicates coding tree blocks outside a selected region of interest, wherein the coding tree blocks outside the selected region of interest are encoded as gray tiles to reduce bitrate.
14. A system comprising:
   a. a non-transitory memory configured for storing an application, the application configured for:
      i. receiving a bitstream of a video, wherein the bitstream includes a supplemental enhancement information message, further wherein the supplemental information message signals all tiles are independently decodable and that regions of interest are able to have more than one tile per region of interest; and
      ii. decoding the bitstream; and
   b. a display configured for displaying the decoded bitstream.
15. The system of clause 14 wherein all tiles in a base layer of the video are independently decodable.
16. The system of clause 14 wherein all tiles in an enhancement layer of the video are independently decodable.
17. The system of clause 14 wherein decoding includes providing a mapping of a region of interest in an enhancement layer to the region of interest in a base layer.
18. The system of clause 14 wherein decoding includes providing a mapping of a region of interest in a base layer to the region of interest in an enhancement layer.
19. The system of clause 14 wherein a region of interest of the video is selected by a user, wherein the region of interest selected by the user is presented on the device.
20. The system of clause 14 wherein a region of interest of the video is selected by a user, wherein the region of interest selected by the user is presented on a second device.
21. The system of clause 14 wherein a region of interest of the video is selected by a director, wherein the region of interest selected by the director is presented on the device of a user.
22. The system of clause 14 wherein the video is encoded with independently decodable tiles and in one or more resolution layers and stored on a server.
23. The system of clause 14 wherein different users request different resolution layers of the video.
24. The system of clause 14 wherein different directors request different resolution layers of the video.
25. The system of clause 14 wherein the supplemental enhancement information message indicates coding tree blocks outside a selected region of interest, wherein the coding tree blocks outside the selected region of interest are not displayed.
26. The system of clause 14 wherein the supplemental enhancement information message indicates coding tree blocks outside a selected region of interest, wherein the coding tree blocks outside the selected region of interest are encoded as gray tiles to reduce bitrate.
27. An apparatus comprising:
   a. a non-transitory memory for storing an application, the application for:
      i. receiving a bitstream of a video, wherein the bitstream includes a supplemental enhancement information message, further wherein the supplemental information message signals all tiles are independently decodable and that regions of interest are able to have more than one tile per region of interest; and
      ii. decoding the bitstream; and
   b. a processing component coupled to the memory, the processing component configured for processing the application.
28. The apparatus of clause 27 wherein all tiles in a base layer of the video are independently decodable.
29. The apparatus of clause 27 wherein all tiles in an enhancement layer of the video are independently decodable.
30. The apparatus of clause 27 wherein decoding includes providing a mapping of a region of interest in an enhancement layer to the region of interest in a base layer.

31. The apparatus of clause 27 wherein decoding includes providing a mapping of a region of interest in a base layer to the region of interest in an enhancement layer.
32. The apparatus of clause 27 wherein a region of interest of the video is selected by a user, wherein the region of interest selected by the user is presented on the device.
33. The apparatus of clause 27 wherein a region of interest of the video is selected by a user, wherein the region of interest selected by the user is presented on a second device.
34. The apparatus of clause 27 wherein a region of interest of the video is selected by a director, wherein the region of interest selected by the director is presented on the device of a user.
35. The apparatus of clause 27 wherein the video is encoded with independently decodable tiles and in one or more resolution layers and stored on a server.
36. The apparatus of clause 27 wherein different users request different resolution layers of the video.
37. The apparatus of clause 27 wherein different directors request different resolution layers of the video.
38. The apparatus of clause 27 wherein the supplemental enhancement information message indicates coding tree blocks outside a selected region of interest, wherein the coding tree blocks outside the selected region of interest are not displayed.
39. The apparatus of clause 27 wherein the supplemental enhancement information message indicates coding tree blocks outside a selected region of interest, wherein the coding tree blocks outside the selected region of interest are encoded as gray tiles to reduce bitrate.
40. A method programmed in a non-transitory memory of a device comprising:
    a. receiving a bitstream of a video with a base layer and one or more enhancement layers, wherein the bitstream includes a supplemental enhancement information message of an enhancement layer, further wherein the supplemental information message is utilized with inter layer constrained tile sets which can signal all tiles are independently decodable of any other tiles in the layer and that regions of interest have more than one tile per region of interest in the layer, and
    b. decoding the bitstream on the device.
41. The method of clause 40 wherein a region of interest of the video is selected by a user, wherein the region of interest selected by the user is presented on the device.
42. The method of clause 40 wherein a region of interest of the video is selected by a user, wherein the region of interest selected by the user is presented on a second device.
43. The method of clause 40 wherein a region of interest of the video is selected by a director, wherein the region of interest selected by the director is presented on the device of a user.
44. The method of clause 40 wherein different users request different resolution layers of the video.
45. The method of clause 40 wherein different directors request different resolution layers of the video.
46. A system comprising:
    a. a non-transitory memory configured for storing an application, the application configured for:
        i. receiving a bitstream of a video with a base layer and one or more enhancement layers, wherein the bitstream includes a supplemental enhancement information message of an enhancement layer, further wherein the supplemental information message is utilized with inter layer constrained tile sets which can signal all tiles are independently decodable of any other tiles in the layer and that regions of interest have more than one tile per region of interest in the layer; and
        ii. decoding the bitstream; and
    b. a display configured for displaying the decoded bitstream.
47. The system of clause 46 wherein a region of interest of the video is selected by a user, wherein the region of interest selected by the user is presented on the device.
48. The system of clause 46 wherein a region of interest of the video is selected by a user, wherein the region of interest selected by the user is presented on a second device.
49. The system of clause 46 wherein a region of interest of the video is selected by a director, wherein the region of interest selected by the director is presented on the device of a user.
50. The system of clause 46 wherein different users request different resolution layers of the video.
51. The system of clause 46 wherein different directors request different resolution layers of the video.
52. An apparatus comprising:
    a. a non-transitory memory for storing an application, the application for:
        i. receiving a bitstream of a video with a base layer and one or more enhancement layers, wherein the bitstream includes a supplemental enhancement information message of an enhancement layer, further wherein the supplemental information message is utilized with inter layer constrained tile sets which can signal all tiles are independently decodable of any other tiles in the layer and that regions of interest have more than one tile per region of interest in the layer; and
        ii. decoding the bitstream; and
    b. a processing component coupled to the memory, the processing component configured for processing the application.
53. The system of clause 52 wherein a region of interest of the video is selected by a user, wherein the region of interest selected by the user is presented on the device.
54. The system of clause 52 wherein a region of interest of the video is selected by a user, wherein the region of interest selected by the user is presented on a second device.
55. The system of clause 52 wherein a region of interest of the video is selected by a director, wherein the region of interest selected by the director is presented on the device of a user.
56. The system of clause 52 wherein different users request different resolution layers of the video.
57. The system of clause 52 wherein different directors request different resolution layers of the video.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method, comprising:
   in a first device:
   receiving a bitstream of a video, wherein
   the bitstream includes a motion-constrained tile sets supplemental enhancement information message, and
   the supplemental enhancement information message comprises a flag having a value indicating one of:
   a decoded value of each sample of tiles in the motion-constrained tile sets is not the same as a decoded value of the same sample of tiles when all coding tree blocks of a picture of the video are decoded and when the coding tree blocks that do not belong to any tile in the motion-constrained tile sets are not decoded; and
   a decoded value of each sample in the tiles in the motion-constrained tile sets is the same as a decoded value of the same sample of tiles when the coding tree blocks that do not belong to any tile in the motion-constrained tile sets are not decoded; and
   decoding the bitstream, based on the value of the flag of the supplemental enhancement information message, to generate an image.

2. The method of claim 1 wherein all tiles in a base layer of the video are independently decodable.

3. The method of claim 1 wherein all tiles in an enhancement layer of the video are independently decodable.

4. The method of claim 1 wherein
   a region of interest of the video is selected by a user, and
   the region of interest selected by the user is presented on the first device.

5. The method of claim 1 wherein
   a region of interest of the video is selected by a user, and
   the region of interest selected by the user is presented on a second device.

6. The method of claim 1 wherein
   a region of interest of the video is selected by a director,
   the region of interest selected by the director is presented on the first device, and
   the director is a user who is able to control the video and/or is able to modify the video.

7. The method of claim 1 wherein
   the video is encoded with independently decodable tiles and in one or more resolution layers, and
   the video is stored on a server.

8. The method of claim 1 wherein different users request different resolution layers of the video.

9. The method of claim 1 wherein different directors request different resolution layers of the video.

10. The method of claim 1 wherein
    the supplemental enhancement information message indicates coding tree blocks outside a selected region of interest, and
    the coding tree blocks outside the selected region of interest are not displayed.

11. The method of claim 1 wherein
    the supplemental enhancement information message indicates coding tree blocks outside a selected region of interest, and
    the coding tree blocks outside the selected region of interest are encoded as tiles that are able to be encoded efficiently to reduce bitrate.

12. An apparatus, comprising:
    a non-transitory memory configured to store an application; and
    a processor coupled to the non-transitory memory, wherein the processor is configured to execute the application to:
    receive a bitstream of a video, wherein
    the bitstream includes a motion-constrained tile sets supplemental enhancement information message, and
    the supplemental enhancement information message comprises a flag having a value indicating one of:
    a decoded value of each sample of tiles in the motion-constrained tile sets is not the same as a decoded value of the same sample of tiles when all coding tree blocks of a picture of the video are decoded and when the coding tree blocks that do not belong to any tile in the motion-constrained tile sets are not decoded; and
    a decoded value of each sample in the tiles in the motion-constrained tile sets is the same as a decoded value of the same sample of tiles when the coding tree blocks that do not belong to any tile in the motion-constrained tile sets are not decoded; and
    decode the bitstream, based on the value of the flag of the supplemental enhancement information message, to generate an image.

13. A system, comprising:
    non-transitory memory configured to store an application;
    a processor coupled to the non-transitory memory, wherein the processor is configured to execute the application to:
    receive a bitstream of a video, wherein
    the bitstream includes a supplemental enhancement information message, and
    the supplemental enhancement information message comprises a flag having a value indicating one of:
    a decoded value of each sample of tiles in the motion-constrained tile sets is not the same as a decoded value of the same sample of tiles when all coding tree blocks of a picture of the video are decoded and when the coding tree blocks that do not belong to any tile in the motion-constrained tile sets are not decoded; and
    a decoded value of each sample in the tiles in the motion-constrained tile sets is the same as a decoded value of the same sample of tiles when the coding tree blocks that do not belong to any tile in the motion-constrained tile sets are not decoded; and
    decode the bitstream, based on the value of the flag of the supplemental enhancement information message, to generate an image; and
    a display configured for display the decoded bitstream.

* * * * *